P. C. BURDICK & R. JESSOP.
PORTABLE POWER SAW.
APPLICATION FILED JUNE 10, 1909.
962,003.
Patented June 21, 1910.
2 SHEETS—SHEET 1.
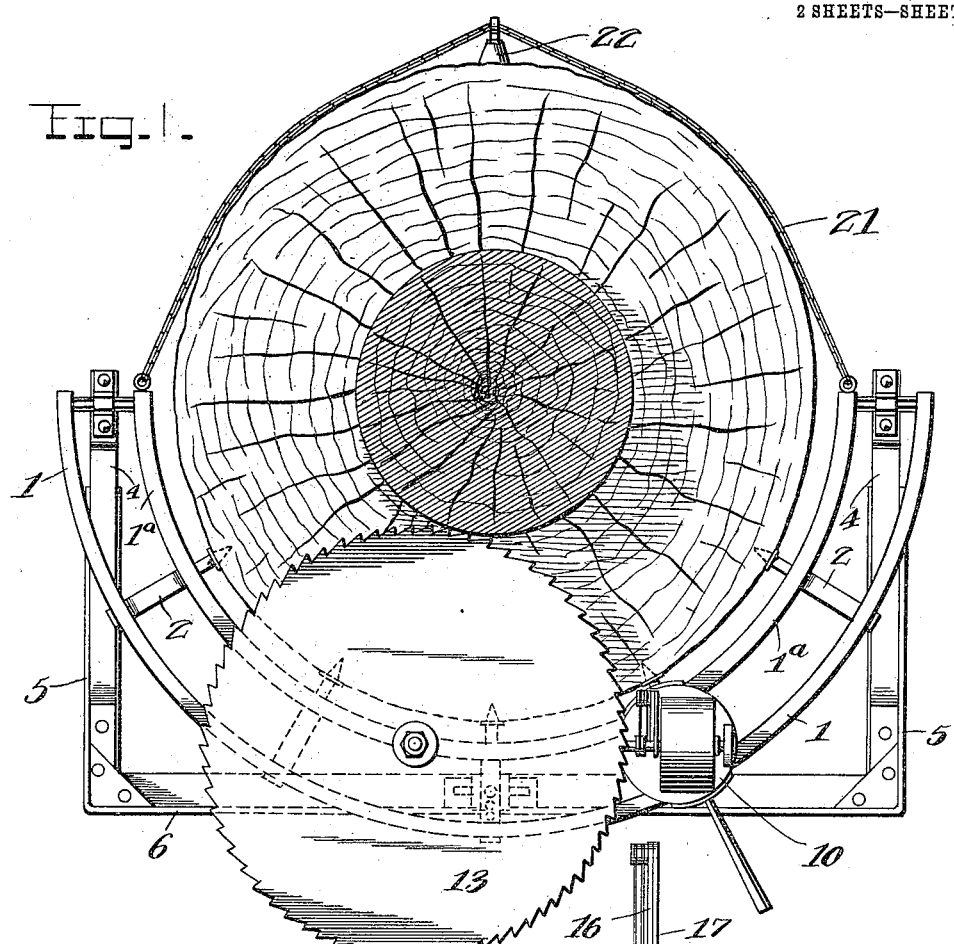
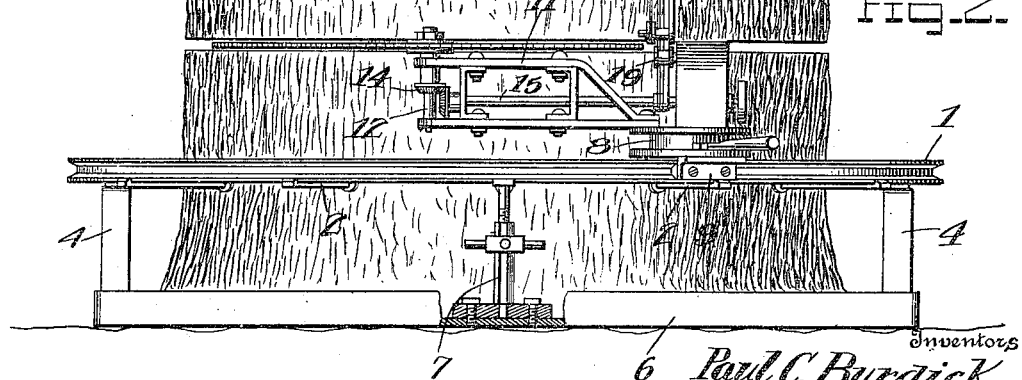
Witnesses
W. H. Rockwell
Caroline Morgan.
Inventors
Paul C. Burdick
Richard Jessop
By Langdon Moore
Attorney

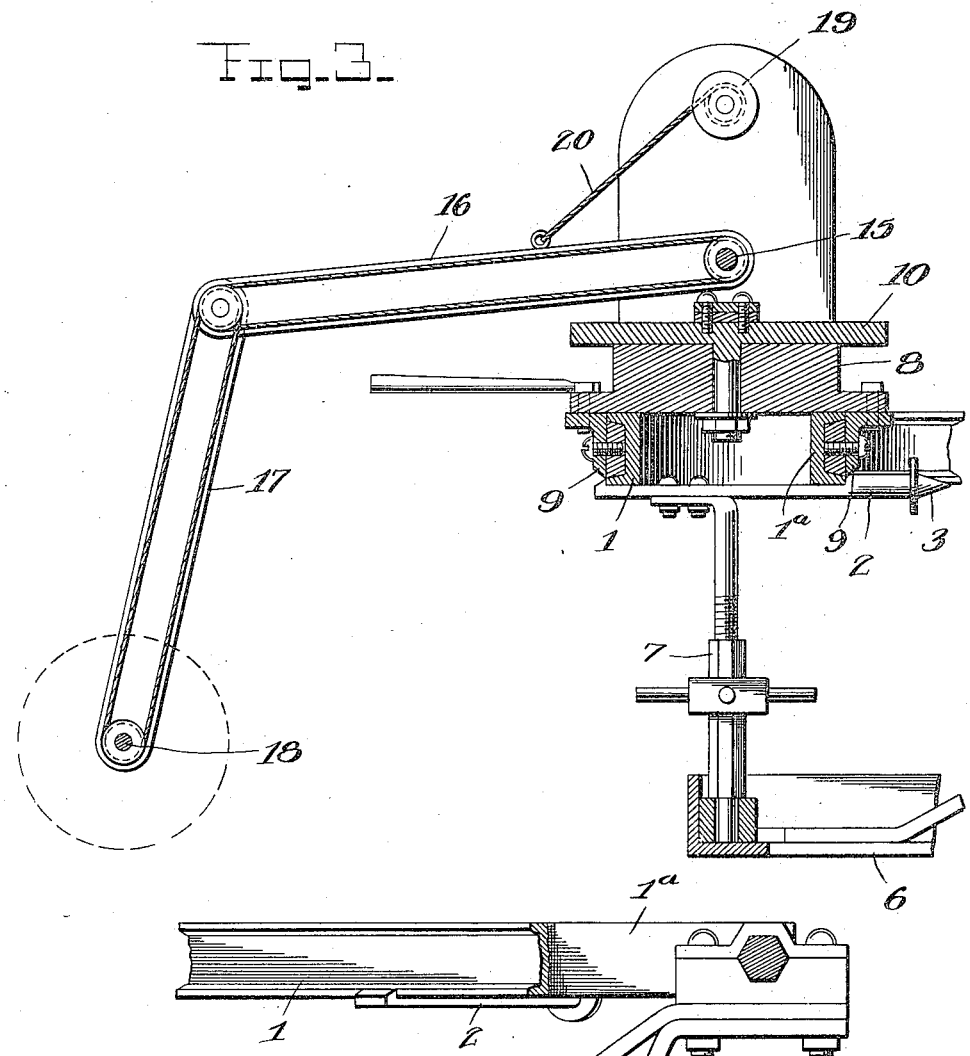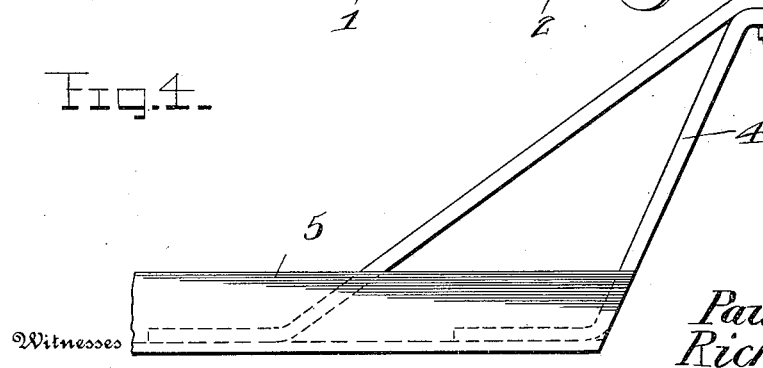

UNITED STATES PATENT OFFICE.

PAUL C. BURDICK AND RICHARD JESSOP, OF OGDEN, UTAH.

PORTABLE POWER-SAW.

962,003.  Specification of Letters Patent.  Patented June 21, 1910.

Application filed June 10, 1909. Serial No. 501,354.

*To all whom it may concern:*

Be it known that we, PAUL C. BURDICK and RICHARD JESSOP, citizens of the United States, residing at Ogden, in the county of Weber and State of Utah, have invented new and useful Improvements in Portable Power-Saws, of which the following is a specification.

This invention relates to improvements in portable power saws and more particularly to a saw of this character which is mounted to travel upon a track.

The object of this invention is to provide a saw of this character mounted to travel upon a curved track.

A saw constructed in accordance with this invention is of particular advantage in the falling of standing trees or in the trimming of stumps, as well as in the cutting of logs and the splitting of stumps to facilitate their removal.

While the preferred form of this invention is illustrated on the accompanying sheets of drawing, yet it is to be understood that minor detail changes may be made without departing from the scope thereof.

Figure 1 is a top plan view of a saw of this character as applied in making a cut upon a standing tree. Fig. 2 is a front elevation of the same. Fig. 3 is an enlarged detail view partly in section. Fig. 4 is an enlarged detail view in side elevation of one end of the track with parts broken away.

The track comprises two parallel channel irons 1 and 1ª bent in the form of a semicircle with their flanges extending outwardly. A plurality of radial ties 2 are secured to the underside of the track having their inner ends extending toward the center of the curvature and are provided with spurs 3 for engaging the tree trunk. The ends of the track are pivotally mounted upon a support 4 extending upward from the side arms 5 of the base 6. The center of the track is supported by an adjustable member 7 carried by the base.

A carriage 8 is mounted to travel upon the track and is provided on each side with depending guides 9 engaging between the flanges of the channel irons 1 and 1ª. A base plate 10 is centrally pivoted upon the carriage and is provided with means for securing said base plate thereto. An outwardly extending saw arm 11 is secured to the base plate with a vertical shaft mounted at its outer end. The outer ends of this shaft 12 are provided with means by which a circular saw 13 can be attached thereto and a bevel gear wheel 14 is secured to the shaft at an intermediate point. A horizontal driving shaft 15 is mounted in the saw arm with a bevel gear wheel at its outer end intermeshing with the beveled gear wheel upon the vertical shaft. An electric motor, gas engine, or other source of driving power, is mounted and carried upon the rotatable base plate and is directly connected to the inner end of the horizontal driving shaft 15.

A pivoted arm 16 is mounted upon a bearing surrounding the driving shaft 15 and extends at right angles thereto. An extension arm 17 is pivoted to the outer end of the pivoted arm 16, and the free end of the extension arm is provided with a transverse shaft 18. A circular saw may be attached to one end of the transverse shaft and pulleys are arranged upon the other end of the transverse shaft, the pivotal points between the two arms and upon the driving shaft, so that power may be supplied from the driving shaft to the saw at the end of the extending arm by a belt passing over said pulleys. A small winch or drum 19 either operated by the source of motive power or by hand is secured above the driving shaft over the inner end of the pivoted arm. By connecting this winch or drum with a guy rope 20 attached to the pivoted arm 16, the said arm may be raised or lowered as desired.

In operation the circular track is placed against the standing tree to be cut and is firmly secured thereto by placing a chain 21 around the opposite side of the tree and securing it to each end of the track. The chain may be drawn taut and the spurs upon the ties forced into engagement with the trunk by placing a small jack 22 between the trunk of the tree and the chain on the side opposite the track. Should the ground be uneven, the adjustable member 7 or screw jack between the center of the track and the base may be operated or adjusted until the track is in a horizontal position. This adjustable means also allows the altering of the angle of the cut where it is desired.

Before securing the track in place the traveling carriage is moved to one end thereof and the base plate turned outwardly upon the carriage so that the saw blade will not interfere with the positioning of the track. After the track has been secured in position the motor is started which operates the saw, and the cut in the tree trunk is begun by inserting a detachable handle in the base plate and applying pressure thereto until the proper depth of the cut is reached. The base plate is then secured to the carriage, and the carriage is caused to travel upon the track to complete the cut upon that side of the tree. The saw arm is then swung around so that saw is in position to finish cut without moving track. It is preferable to leave a small segment of the trunk uncut, which may be severed by a hand saw after the track and saw have been removed to a safe distance.

In trimming stumps the cut may be made completely through the trunk. And when the saw is used for this purpose the track may be mounted upon skids and the saw secured to the lower end of the driving shaft in order that the cut may be made as close to the ground as possible. When it is desirable to segregate the root of a stump or to cut the top of a stump into vertical sections, the circular saw is removed from the saw arm and secured to the transverse shaft in the extension from the pivoted arm. The carriage is then moved to one end of the track and the track placed in such a position so that the part to be cut will be within cutting distance of the vertical saw. The pivoted arm may be raised and lowered to accommodate different conditions by the connection between the arm and the drum or winch. The regular saw driven in the vertical position may be used as well for cutting logs.

It is seen that by this invention a clean cut can be made in falling a standing tree, or in trimming a stump with very little exercise of manual labor, and by using the same device the trunk may be split up into parts and the stump segregated from the root.

What we claim is:—

1. In a saw of the character described, a base, a semicircular track pivoted at its extremities to the base, means for changing the angular relation between the base and track, a carriage mounted to travel upon the track, a rotatable base plate pivotally carried upon the carriage, a saw arm mounted upon the base plate, a circular saw carried by the saw arm, and means upon the base plate operatively connected with the saw to rotate the same.

2. In a saw of the character described, a base having a main portion and angular extensions at each end thereof, a semicircular track above the base pivotally connected at its extremities to the ends of the base extensions, an adjustable connection between the center of the track and main base, a carriage mounted to travel upon the track, a base plate rotatably mounted upon the carriage, a rigid saw arm extending from the base plate, a circular saw horizontally mounted at the extremity of the saw arm, a source of mechanical power mounted upon the base plate, and a mechanical connection between the saw and source of power to rotate the saw.

PAUL C. BURDICK.
RICHARD JESSOP.

Witnesses to signature of Paul C. Burdick:
M. D. BUTLER,
F. K. SWAN.

Witnesses to signature of Richard Jessop:
OLIN A. KENNEDY,
MAE ALLISON.